United States Patent [19]

Merzer

[11] Patent Number: 5,521,508
[45] Date of Patent: May 28, 1996

[54] METHOD AND APPARATUS FOR PREDICTING THE OCCURRENCE OF AN EARTHQUAKE BY IDENTIFYING ELECTROMAGNETIC PRECURSORS

[75] Inventor: Moshe Merzer, Haifa, Israel

[73] Assignee: State of Israel Ministry of Defense Aramament Development Authority Rafael, Haifa, Israel

[21] Appl. No.: 258,976

[22] Filed: Jun. 10, 1994

[30] Foreign Application Priority Data

Jun. 11, 1993 [IL] Israel ......................................... 105991

[51] Int. Cl.⁶ .............................. G01V 3/08; G01V 3/40
[52] U.S. Cl. ........................ 324/345; 324/323; 324/344
[58] Field of Search ...................................... 324/301, 323, 324/344, 345, 348–350, 72; 340/601, 690

[56] References Cited

U.S. PATENT DOCUMENTS

| | | | |
|---|---|---|---|
| 4,884,030 | 11/1989 | Naville et al. | ........................ 324/345 X |
| 4,904,943 | 2/1990 | Takahashi . | |
| 5,270,649 | 12/1993 | Laukien . | |

FOREIGN PATENT DOCUMENTS

| | | |
|---|---|---|
| 326638 | 8/1989 | European Pat. Off. . |
| 1193620 | 11/1985 | U.S.S.R. . |
| 1315917 | 6/1987 | U.S.S.R. . |

OTHER PUBLICATIONS

A. C. Fraser–Smith et al, "Low Frequency Magnetic Field Measurements Near the Epicenter of the . . . " Geophysical Research Letters, vol. 17, No. 9, pp. 1465–1468, 1990.

Jack Y. Dea et al, "Observations of Seismo Electromagnetic Earthquake precursor Radiation Signatures Along . . . " Can. J. Phys. vol. 69, pp. 1138–1145, 1991.

O. A. Molchanov et al, "Results of ULF Magnetic Field Measurements Near the Epicenters of the Spitak . . . " Geophysical Research Letters, vol. 19, No. 14, pp. 1495–1498, 1992.

A. C. Fraser–Smith et al, "Large–Amplitude ULF Electromagnetic Fields from BART", Radio Science, vol. 13, No. 4, pp. 661–668, 1978.

A. Bernardi et al, "ULF Magnetic Field Measurements Near the Epicenter of the Ms 7.1 Loma Prieta Earthquake", Physics of the Earth and Planetary Interiors, 68 (1991), pp. 45–63.

P. Varotsos et al, "Physical Properties of the Variations of the Electric Field of the Earth Preceding Earthquakes, I", Tectonophysics, 110 (1984), pp. 73–98.

A. Bernardi et al, "Measurements of BART Magnetic Fields with an Automatic Geomagnetic Pulsation Index Generator", IEEE Trans. on Electromagnetic Compatibility, vol. 31, No. 4, 1989.

G. Purcaru et al, "Quantitative Relations of Seismic Source Parameters and A Classification of Earthquakes", Tectonophysics 84 (1982), pp. 57–128.

"The Loma Prieta, California, Earthquake: An Anticipated Event" U.S. Geological Survey Staff. Science vol. 247, 1990. pp. 286–293.

*Primary Examiner*—Gerard R. Strecker
*Attorney, Agent, or Firm*—Helfgott & Karas

[57] ABSTRACT

A method and apparatus for predicting the occurrence of an earthquake in a monitored area as described by detecting the vertical component of the Earth's magnetic field at a plurality of pairs of spaced points, the spacing "d" between the points of each pair being from 450 to 2,300 meters in a first horizontal direction, the spacing "Y" between each pair of points being between 450 and 25,000 meters in a second horizontal direction substantially perpendicular to the first horizontal direction.

19 Claims, 5 Drawing Sheets

METHOD AND APPARATUS FOR PREDICTING THE OCCURRENCE OF AN EARTHQUAKE BY IDENTIFYING ELECTROMAGNETIC PRECURSORS

BACKGROUND OF THE INVENTION

The present invention relates to a method and apparatus for predicting the occurrence of an earthquake, and particularly for locating and identifying electromagnetic precursors to earthquakes.

Earthquake prediction is a very practical topic which can potentially save the lives of millions of persons. Considerable efforts have been made to identify suitable earthquake precursors which may be used for predicting the occurrence of an earthquake, but nevertheless reliable prediction methods are still not completely satisfactory.

The present state of knowledge is that many regions for potential earthquakes are known, but the time of occurrence of any earthquake within these regions is still undetermined. Many precursory phenomena have been observed (e.g., seismicity; electric, magnetic, gravity anomalies; animal movements), but none has yet been found to be a reliable predictor of an earthquake. At the present time, the best method of prediction is statistical, where the probability of an earthquake occurring in a certain region over a certain number of years is given. Earthquake regions which have not had relatively recent events are of higher probability as compared to regions which have been seriously skaken recently.

About two years ago attention became focussed on electromagnetic precursors when immediately before the Oct. 17, 1989 Loma Prieta earthquake near San Francisco, ULF (ultralow frequency) magnetic noise anomalies were found to have been measured about 7 km from the epicentre. A theory, more particularly described below, has been proposed by the inventor of the present method which predicted the anomalies to a relatively high accuracy.

If the anomalies lie in the narrow regions according to this theory, as described more particularly below their use as forewarners of oncoming earthquakes becomes a very difficult process. The Loma Prieta ULF anomalies were observed using a solenoid. If such solenoids were to be used to identify the above-mentioned narrow regions, they would have to be placed at spacings at 100 meters in lines across earthquake regions like California. For these lines to be about 15 km apart, it would require about 60,000 solenoids to cover the California earthquake region.

It has been previously proposed, for example as described in USSR Patent SU1315917 (1987), to monitor variations in the vertical component of the Earth's magnetic field in order to predict the occurrence of an earthquake. In the method described in that patent, a point of observation is selected in a region having a weakly-pronounced sedimentary strata, which represents a known potential earthquake fault. At a distance of one-tenth of the seismic wavelength of the known potential earthquake fault, observations are carried out to detect the ratio of the vertical component of the pulsations of the Earth's magnetic field to its horizontal component. Taking 5 Hz as the peak frequency, and 6.5 km/sec a typical seismic velocity for bedrock (see line 4, Page 1238 in Eberhart-Phillips D. et al., Geophys. Res. Lett. 17(8) 1235–1238 (7/1990), it will be seen that one wavelength is about 1,300 meters, and therefore one-tenth wavelength is about 130 meters.

Thus, a serious limitation in the method described in this publication is that the potential earthquake fault must be known within a distance of tens of meters, since the observation (e.g., location of the magnetometer) must be at a distance of approximately 130 meters from the known potential earthquake fault. Moreover, as will be described below (particularly with reference to FIG. 3 of the accompanying drawings), if the vertical component of the magnetic field is measured too near the earthquake fault, an anomalous field will not be measured, and therefore a potential earthquake warning may be missed.

OBJECTS AND SUMMARY OF THE PRESENT INVENTION

One object of the present invention is to provide a method and apparatus for predicting the occurrence of an earthquake in a monitored area where a potentional earthquake fault is not known within an accuracy of tens of meters. Another object of the present invention is to provide a method and apparatus for predicting an occurrence of an earthquake in a monitored area where a potential earthquake fault is known within such an accuracy.

According to one aspect of the present invention, there is provided a method of predicting the occurrence of an earthquake in a monitored area, comprising: detecting the vertical component of the Earth's magnetic field at a plurality of pairs of spaced points, the spacing "d" between the points of each pair being from 450 to 2,300 meters in a first horizontal direction, the spacing "Y" between each pair of points being between 450 and 25,000 meters in a second horizontal direction substantially perpendicular to the first horizontal direction; and utilizing the detected vertical components for predicting the occurrence of an earthquake in the monitored area.

As will be more particularly described below, the above spacings "d" and "Y" are applicable to detect earthquakes of a magnitude of 3.0 on the Richter Scale or higher. When it is sufficient to detect magnitudes of 7.1 or higher, the spacing "d" may be from 900 to 2,300 meters, and the spacing "Y" may be from 15,000 to 25,000 meters.

According to further features in the preferred embodiment of the invention described below, the vertical component of the Earth's magnetic field is detected along a plurality of lines of the spaced points, the lines being separated from each other a spacing "D" which is at least 20,000 meters in the first horizontal direction.

The invention also provides a method of predicting the occurrence of an earthquake at a known potential earthquake fault, comprising: detecting the vertical component of the Earth's magnetic field at a plurality of pairs of spaced points straddling the known potential earthquake fault, the spacing "d" between the points of each pair being from 450 to 2,300 meters transversely of the known potential earthquake fault the spacing "Y" between each pair of points being from 450 to 25,000 meters in the direction of the known potential earthquake fault.

The invention also provides apparatus for predicting the occurrence of an earthquake in accordance with the above method.

The vertical component of the Earth's magnetic field may be measured by a static-type magnetometer which measures the amplitude of the vertical component of the Earth's magnetic field from frequencies of about 0.01 to about 10 Hz; fluxgate type magnetometers or quartz variometers are examples of such static-type magnetometers which may be used. However, a solenoid-type magnetometer may also be used which measures the rate of change of the vertical component of the Earth's magnetic field.

As will be described more particularly below, the method and apparatus of the present invention distinguish over the method described in the above-cited Russian publication in that it is not essential to know the location of potential earthquake faults; moreover, the danger of missing a potential earthquake warning by making the observation too near the earthquake fault, a drawback in the method of the Russian patent, is avoided by detecting the vertical components of the Earth's magnetic field at a plurality of pairs of spaced points with the spacings as set forth above.

BRIEF DESCRIPTION OF THE DRAWINGS

The invention will be better understood by the description below taken in conjunction with the accompanying drawings, wherein.

BRIEF DESCRIPTION OF THE NOVEL THEORY

Figure 1:
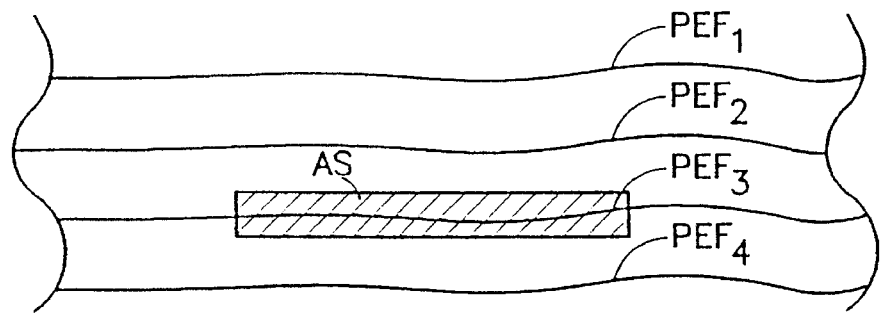
FIG. 1 schematically illustrates a plurality of known potential earthquake faults and the anomalous strip along the fault activated in an earthquake according to the theory referred to above.

The novel theory referred to earlier proposes that the ULF magnetic noise anomalies measured about 7 km from the epicentre of the 1989 Loma Prieta earthquake, were derived from a current in a long underground conducting cylinder of elliptical cross-section. On the surface, the anomalies reached their full amplitude along a strip of about 1 km wide and 1 km high at the fault activated in the earthquake. This is more schematically illustrated in FIG. 1, showing a plurality of known potential earthquake faults, e.g., $PEF_1$–$PEF_4$, and the anomalous strip AS along the activated fault $PEF_3$. The width of the anomalous strip AS is approximately 1 km, and its length is approximately 70 km. Further details of this theory are set forth in the technical report M. Merzer 90/14/317, Rafael (1990). In the above report, an elliptical cylinder was used. However, for the purpose of the explanation below, a circular cylinder will be used as this will be sufficient for the explanation and will simplify it.

Figure 2:
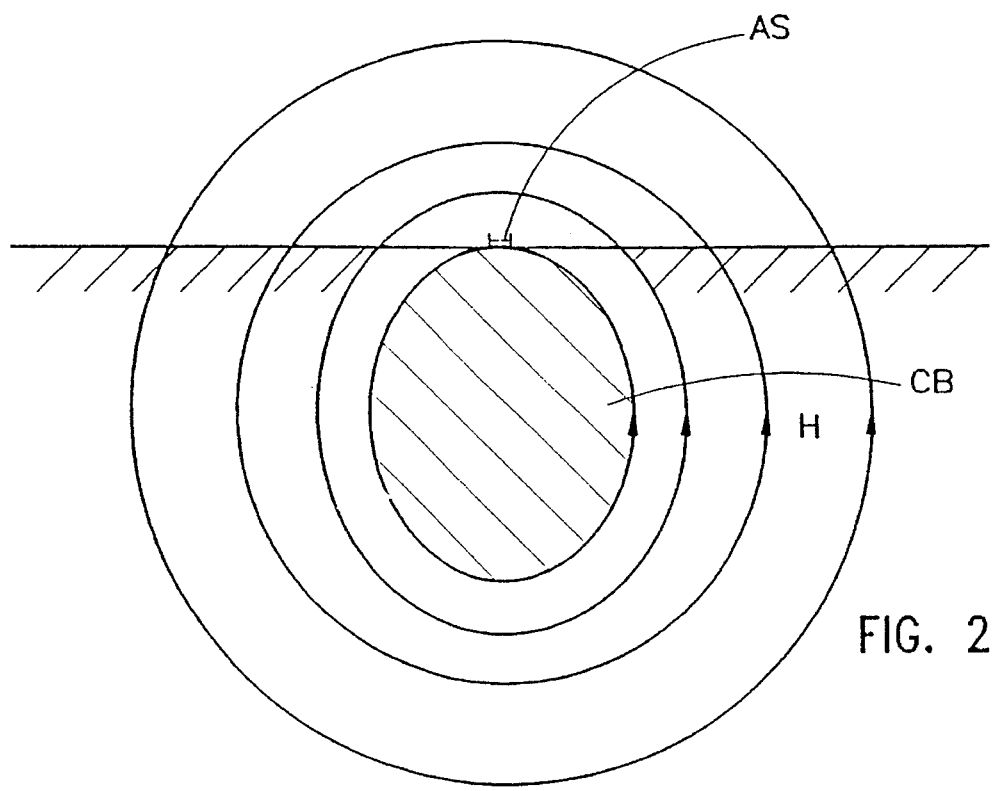
FIG. 2 is a vertical sectional view of the Earth's surface illustrating the magnetic field produced by the anomalous strip at an activated fault.

FIG. 2 is a vertical sectional view of the Earth's surface illustrating the magnetic field produced by the anomalous strip AS at the activated fault $PEF_3$. As shown in FIG. 2, the long underground conducting body CB producing the anomalous strip AS is of elliptical cross-section; also, the magnetic field becomes more vertical with increasing distance from the anomalous strip AS.

Figure 3:
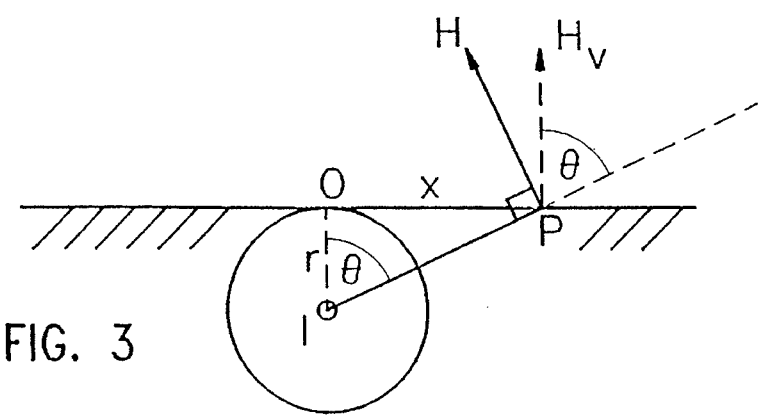
FIG. 3 illustrates the ULF magnetic field near the conducting cylinder at the anomalous strip of an activated fault according to the above-mentioned theory.

FIG. 3 illustrates the ULF magnetic field generated by the conducting body CB, wherein it will be seen that at point P (the observation point):

$$H = \frac{I}{2\pi(r \sec \theta)} \quad \text{Eq. 1}$$

$$\begin{aligned} H_V &= H \sin \theta & \text{Eq. 2}\\ &= \frac{I}{2\pi r} \sin \theta \cos \theta \\ &= \frac{I}{4\pi r} \sin 2\theta \end{aligned}$$

$$x = r \tan \theta \quad \text{Eq. 3}$$

Figure 4:
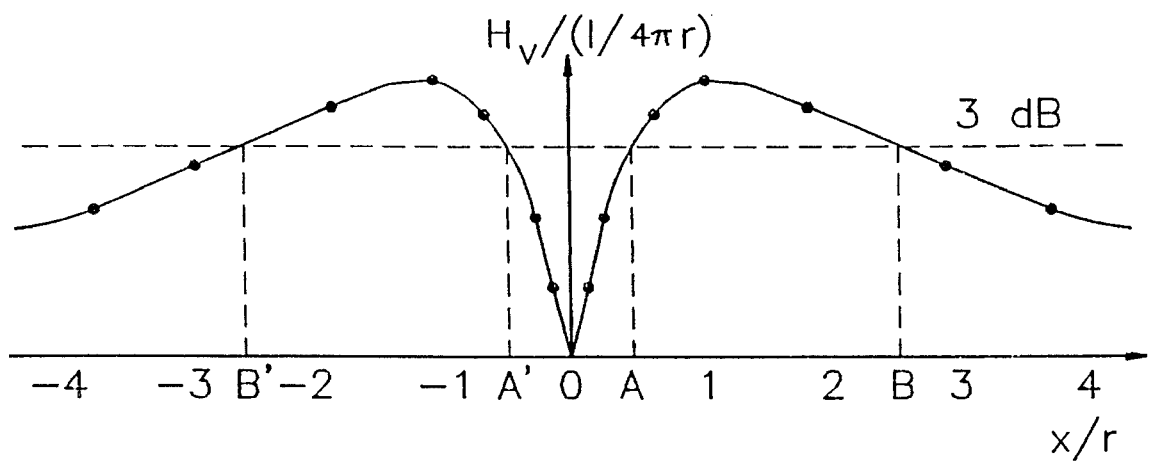
FIG. 4 illustrates the vertical component of the magnetic field of FIG. 3 as compared to the distance from the anomalous strip.

FIG. 4 illustrates the distribution of the vertical field amplitude $H_V$ normalized to $I/4\pi r$, with respect to distance from the anomalous strip AS, based on the above theory that the anomaly is coming from a current (I) in the underground conducting body CB of cylinder configuration. As seen in FIG. 3, if the vertical field amplitude is directly over the earthquake (at point 0), or too close to it, the vertical component will not be adequately measured, and therefore the potential earthquake warning may be missed. This is one of the drawbacks of the method described in the above-cited Russian publication, as noted above. As also noted above, the method of the Russian publication requires that the potential earthquake fault must be known within a distance of tens of meters because it places the observation point at one-tenth the wavelength of the earthquake, i.e., generally about 130 meters from the earthquake fault.

DESCRIPTION OF PREFERRED EMBODIMENT

Figure 5:
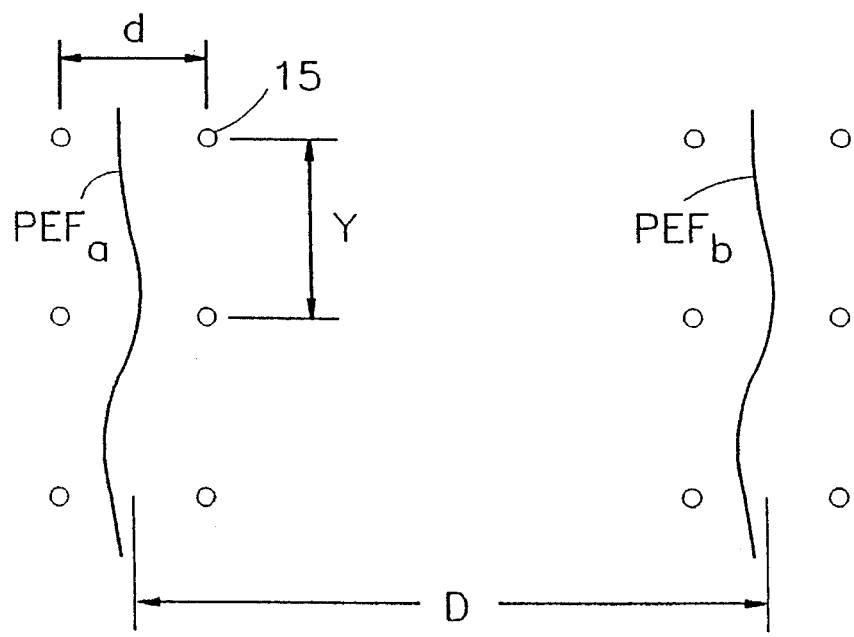
FIG. 5 illustrates an example of the distribution of magnetometers for detecting the vertical components of the Earth's magnetic field in a monitored area containing known potential earthquake faults.

FIG. 5 illustrates one example of the distribution of magnetometers for detecting the vertical components of the Earth's magnetic field in accordance with the present invention. In this example, the monitored area contains known potential earthquake faults, as shown as PEFa and PEFb, respectively.

As shown in FIG. 5, the locations of the observation points 15 (i.e., of magnetometers for measuring the magnetic field vertical components) are along a line including a plurality of pairs of spaced points for each of the potential earthquake faults PEFa, PEFb. The spacing between the points of each pair in the direction perpendicular to the respective fault is shown at "d"; the spacing between pairs in the direction parallel to the fault is shown at "Y"; and the spacing between the two lines of spaced points for the two illustrated faults, in the same direction as "d", is shown at "D".

As will be described below, by detecting the vertical component of the Earth's magnetic points at pluralities of pairs of spaced points, the possibility of missing an actual earthquake warning under the circumstances illustrated in FIG. 3 is thus reduced; also, the spacings "d", "Y" and "D" depend to a large extent on the magnitude of the earthquake to be detected. Examples will be described below of spacings for detecting earthquake magnitudes of 3.0, 7.1 and 9.0, respectively.

FIG. 4 illustrates the manner of determining the spacing "d" between the two magnetometers of each pair. Thus, the spacings "d" which are most beneficial are those near the vertical field's maximum value. Quantitatively, they are defined by a "3 dB" line, which is at a field value of $1/\sqrt{2}$ of the maximum value. In FIG. 4, this "3 dB" line defines ranges AB and A'B' on opposite sides of the anomalous strip AS at point O.

The minimum spacing "d" is between the points AA', since smaller spacing may result in both magnetometers being within the region AA' therefore missing the earthquake warning. The maximum spacing "d" is indicated by the length OB, as greater values may result in one magnetometer being exactly on the anomalous strip while the other lies after the "3 dB" line (line B or B').

In the case of an earthquake magnitude of 7.1 as in the Loma Prieta case involved in the above-cited report, the vertical distance "r" in Equations 1–3 above is approximately 1 km; accordingly, the minimum and maximum values of the distance "x" in FIG. 3 would be 0.9r and 2.3r, respectively, so that the spacing "d" between the magnetometers of a pair for earthquakes of this magnitude should be from 900 to 2,300 meters.

With respect to determining the spacing "Y", namely the spacing between pairs of magnetometers parallel to the earthquake fault, it will be assumed that the anomalous conducting strip AS is as long as the active fault length (L). The spacing "Y" along the fault length should be sufficient to provide a reasonable sample along this fault length; preferably, the spacing "Y" is one-third the fault length. Thus, for a 7.1 magnitude earthquake, the fault length is approximately 75 km, and therefore the spacing "Y" should be about 25 km. On the other extreme, the spacing "Y" should be greater than the distance between the spacing "d" between magnetometers in each pair. For a 7.1 magnitude earthquake, it is preferred to have the spacing "Y" from 15 to 25 km.

The spacing "D" between linear pairs depends on the location of potential earthquake faults where known. Thus, where such faults are known, there should be one line of pairs of magnetometers for each such potential fault.

Where potential earthquake faults in the monitored area are not known, the spacing "D" between the lines of pairs of magnetometers is preferably a minimum of 20 km. This is the distance at which the vertical field falls below the ionospheric field noise level for frequencies around 0.01 Hz, in accordance with the calculations made based on the anomaly described in the above-cited Rafael report. If the two linear arrays of pairs are particularly close to each other, the pairs can be obtained by the combination of one magnetometer from one array with an opposite magnetometer in an adjacent array.

As indicated earlier, the foregoing spacings "d", "Y" and "D" (FIG. 5) are based on an earthquake magnitude of 7.1, as in the Loma Prieta earthquake. For other earthquake magnitudes, these spacings vary as the width (w) of the cylindrical conducting body CB (FIG. 2) producing the anomaly according to the above-described theory. This width (w) varies as follows, according to the above theory:

$$w \alpha L^{0.15} \qquad \text{Eq.4}$$

where L is the fault length. The fault length (L) varies with the earthquake magnitude (M) as follows:

$$\log_{10} L \sim 0.5 M + const \qquad \text{Eq.5}$$

The distances "d" and "D" must thus be multiplied by a factor "f" based on the earthquake magnitude M, as follows:

$$f = 10^{[0.075 \, (M-7.1)]} \qquad \text{Eq.6}$$

Figure 6:
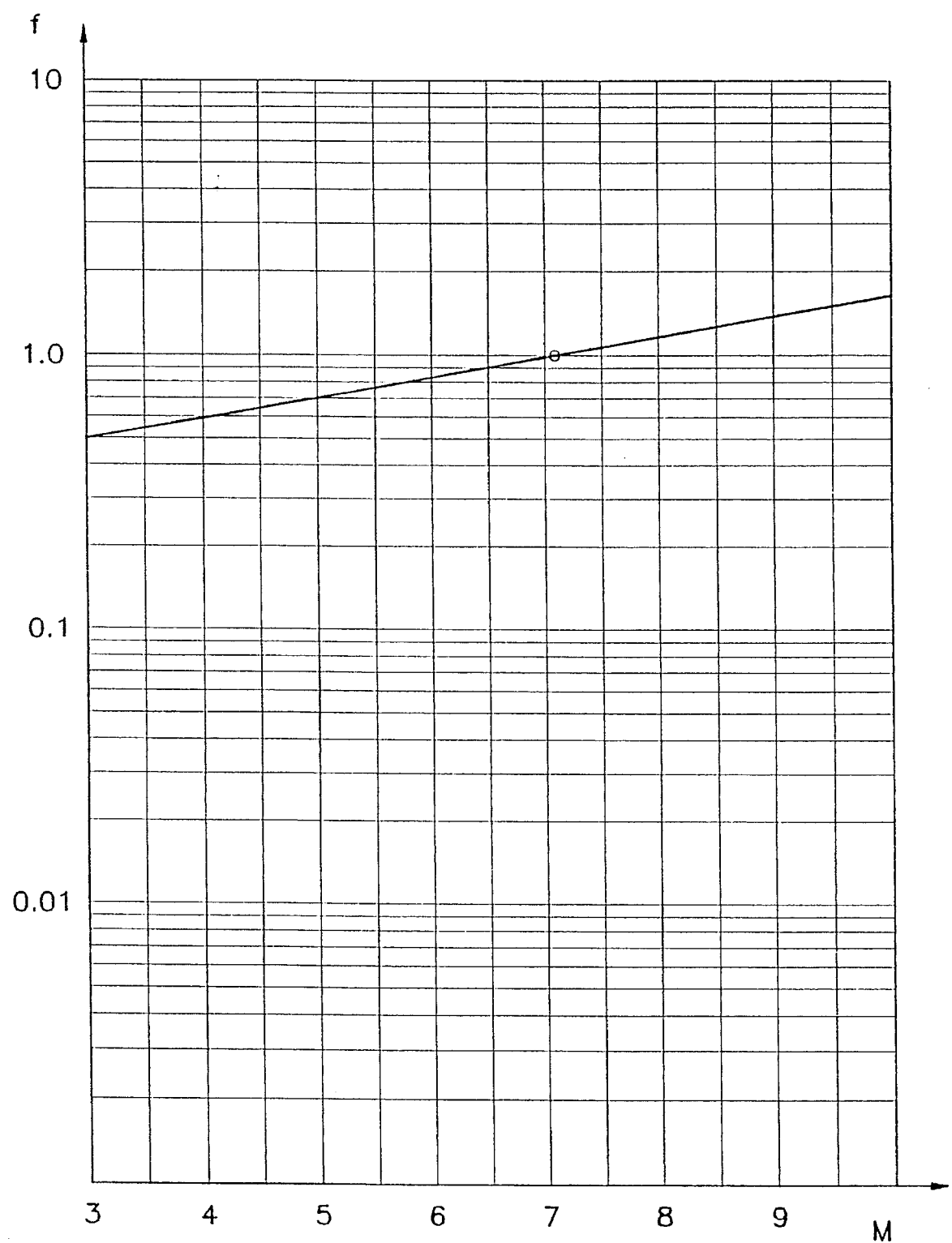
FIG. 6 illustrates the relation of the spacing "d" between magnetometers in a pair, and the spacing "D" between lines of such magnetometers, as a function of the earthquake magnitude "M" according to the above-mentioned theory.

FIG. 6 illustrates how the factor "f" for determining the distances "d" and "D" varies with the earthquake magnitude M. As shown in FIG. 6, based on a multiplication factor "f" of 1.0 at earthquake magnitude 7.1, the factor "f" is equal to 0.5 for an earthquake magnitude of 3, and 1.4 for an earthquake magnitude of 9.

Therefore, the spacing "d" in FIG. 5 should preferably be from 450 to 2,300 meters for detecting earthquake magnitudes of 3.0M or larger; but where it is sufficient to detect earthquake magnitudes of 7.1 or over, then spacing "d" may be from 900 to 2,300 meters.

In both cases, for economy reasons, the spacing "D" is preferably at least 20,000 meters where the potential earthquake faults are not known in the monitored area.

The spacing "Y", between magnetometer pairs along the fault length (FIG. 5) is proportional to the fault length L. Thus, from the dependence of "L" on the earthquake magnitude M as set forth in Equation 5 above, the value "Y" given above for a 7.1 magnitude earthquake should be multiplied by factor "F" as follows:

$$F = 10^{[0.5(M-7.1)]} \qquad \text{Eq.7}$$

Figure 7:
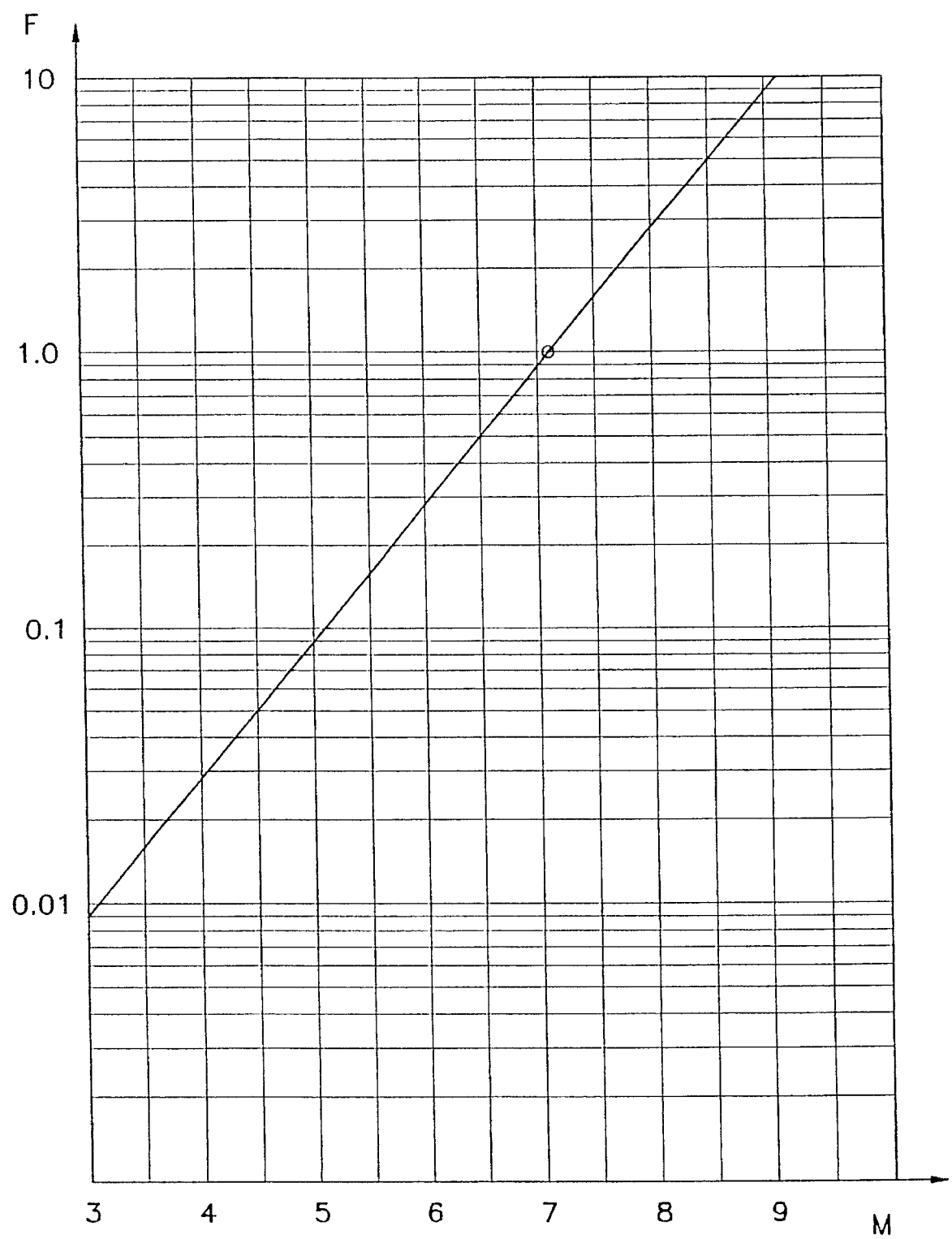
FIG. 7 illustrates the spacing "Y" between pairs of magnetometers as a function of the earthquake magnitude "M" according to the above-mentioned theory.

FIG. 7 illustrates how the factor "F" varies with the earthquake magnitude M, based on "F" being 1.0 for the above described earthquake magnitude of 7.1. Thus, for an earthquake magnitude of 3, "F" is 0.01; and for an earthquake magnitude of 9, "F" is 9.

If the distance "Y" falls below the distance "d", then "Y" should be made approximately equal to "d". Accordingly, for a system to detect earthquake magnitudes of 3.0 and higher, the distance "Y" should be from 450 to 25,000 meters; and for a system to detect earthquake magnitudes of 7.1 or higher, the distance "Y" should be from 15,000 to 25,000 meters.

Using FIGS. 6 and 7, the spacings "d", "D", and "Y" can be calculated for systems designed to detect earthquakes of other magnitudes.

The magnetometers used in the above systems should be capable of working in the ULF (ultralow frequency) range, namely from 0.01 to 10 Hz. The magnetometers can be of two types: (a) the solenoid type, which measures the time variation of the magnetic field (dH/dt); and (b) the static magnetometer type, which measures the static field (H) up to frequencies of about 10 Hz, e.g., flux gate, quartz variometer, etc. The magnetometers used would also determine the type of amplification and filtering required for processing the measured signals, as well known in the art.

Figure 8:
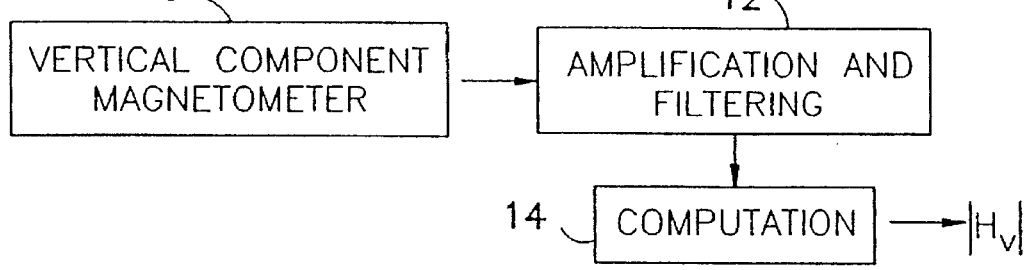
FIG. 8 is a block diagram illustrating a system for processing the outputs of the magnetometers.

FIG. 8 is a block diagram illustrating the system for processing outputs each of the magnetometers. Thus, the system includes an array of vertical component magnetometers, as described above and generally designated 10. Their outputs are amplified and filtered as shown at 12, and are then fed to a processor 14 for making the computations required in order to determine the measured vertical component of the magnetic field ($H_v$), and/or to actuate an alarm in response to the computations.

Figure 9:
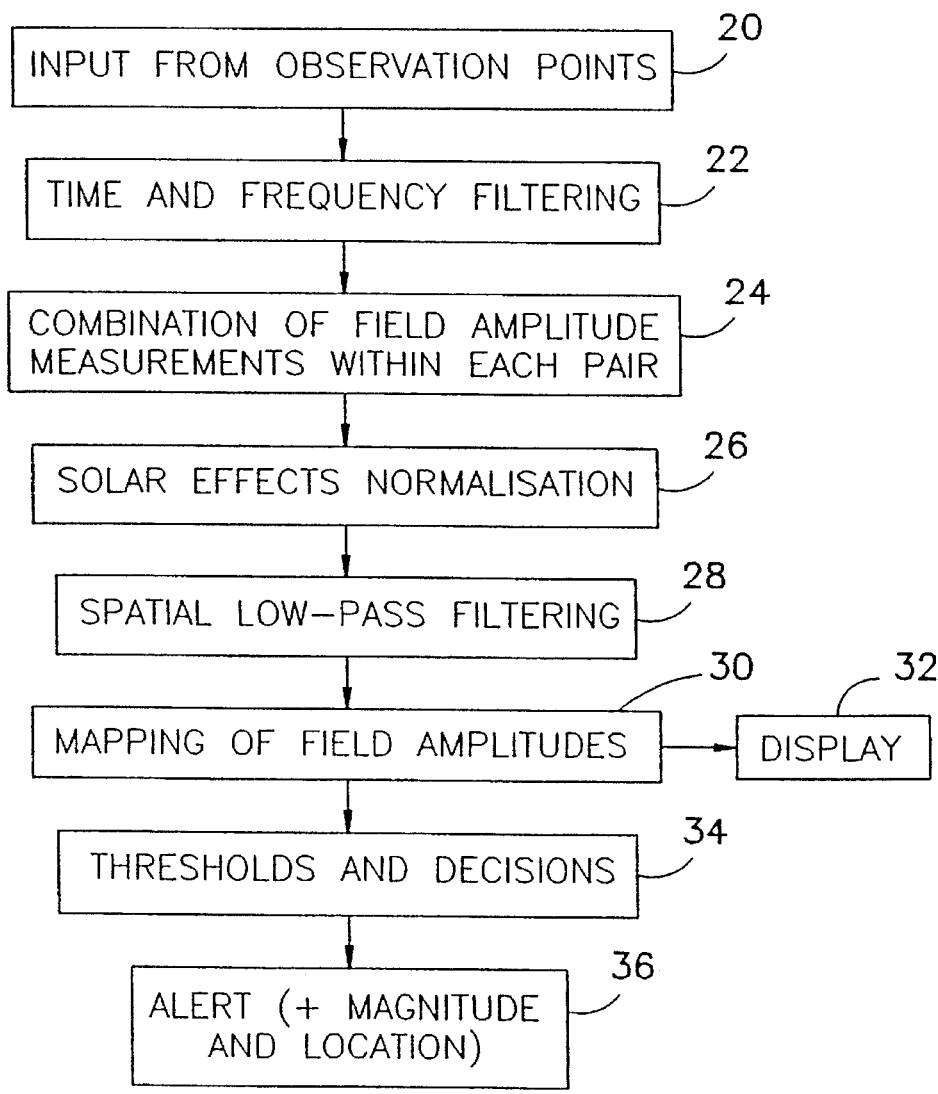
FIG. 9 is a flow chart illustrating the manner of processing the outputs of the magnetometers for predicting the occurrence of an earthquake.

FIG. 9 is a flow chart illustrating the operation of the system of FIG. 8. Thus, the system receives inputs from the magnetometers at the observation points described above and as schematically illustrated in FIG. 5 (block 20). Their outputs are time and frequency filtered (block 22). The field amplitude measurements within each pair are then combined (block 24), and are normalized for solar effects (e.g., from standard laboratory data, control stations, etc.) to compensate for amplitude variations because of solar activity. The outputs are then passed through spatial low-pass filters (block 28) to smoothen out local (e.g., man-made) anomalous effects. The field amplitudes are mapped (block 30) and displayed (block 32). The system then makes decisions based on threshold values which may vary according to local considerations (block 34) for predicting the occurrence of an earthquake, in which case an Alert output is produced predicting the magnitude and location of the earthquake (block 36).

While the invention has been described with respect to several preferred embodiments, it will be appreciated that these are set forth merely for purposes of example, and that many other variations, modifications and applications of the invention may be made.

What is claimed is:

1. A method of predicting the occurrence of an earthquake in an area monitored for earthquakes, comprising:

detecting the vertical component of the Earth's magnetic field at a plurality of pairs of spaced points in said monitored area, the spacing "d" between the points of each pair being from 450 to 2,300 meters in a first horizontal direction, the spacing "Y" between each pair of points being between 450 and 25,000 meters in a second horizontal direction substantially perpendicular to said first horizontal direction;

and utilizing said detected vertical components for predicting the occurrence of an earthquake in said monitored area.

2. The method according to claim 1, wherein said spacing "d" is from 900 to 2,300 meters.

3. The method according to claim 2, wherein said spacing "Y" is from 15,000 to 25,000 meters.

4. The method according to claim 1, wherein the vertical component of the Earth's magnetic field is detected along a plurality of lines of said spaced points, said lines being separated from each other by a spacing "D" which is at least 20,000 meters in said first horizontal direction.

5. A method of predicting the occurrence of an earthquake at a known potential earthquake fault, comprising:

detecting the vertical component of the Earth's magnetic field at a plurality of pairs of spaced points straddling said known potential earthquake fault, the spacing "d" between the points of each pair being from 450 to 2,300 meters transversely of the known potential earthquake fault, the spacing "Y" between each pair of points being from 450 to 25,000 meters in the direction of said known potential earthquake fault.

6. The method according to claim 5, wherein the spacing "Y" between each pair of points is at least one-third the length of, and in the direction of, the known potential earthquake fault.

7. The method according to claim 5, wherein said spacing "d" is from 900 to 2,300 meters.

8. The method according to claim 5, wherein said spacing "Y" is from 15,000 to 25,000 meters.

9. The method according to claim 5, wherein there are a plurality of known potential earthquake faults, and the vertical component of the Earth's magnetic field is detected at a plurality of pairs of spaced points straddling each of said known potential earthquake faults.

10. The method according to claim 1, wherein the amplitude of the vertical component of the Earth's magnetic field is detected and utilized for predicting the occurrence of an earthquake.

11. The method according to claim 1, wherein the rate of change of the vertical component of the Earth's magnetic field is detected and utilized for predicting the occurrence of an earthquake.

12. The method according to claim 1, wherein variations in the detected vertical component of the Earth's magnetic field of a frequency of 0.01 to 10 Hz are utilized in predicting the occurrence of an earthquake.

13. Apparatus for predicting the occurrence of an earthquake in an area monitored for earthquakes, comprising:

detectors for detecting the vertical component of the Earth's magnetic field at a plurality of pairs of spaced points in said monitored area, the spacing "d" between the detectors of each pair being from 450 to 2,300 meters in a first horizontal direction, the spacing "Y" between each pair of detectors being between 450 and 25,000 meters in a second horizontal direction substantially perpendicular to said first horizontal direction;

and means for utilizing said detected vertical components for predicting the occurrence of an earthquake in said monitored area.

14. The apparatus according to claim 13, wherein said spacing "d" is from 900 to 2,300 meters.

15. The apparatus according to claim 13, wherein said spacing "Y" is from 15,000 to 25,000 meters.

16. The apparatus according to claim 13, wherein said detectors are located to detect the vertical component of the Earth's magnetic field along a plurality of lines of said spaced points, said lines being separated from each other a spacing "D" which is at least 20,000 meters in said first horizontal direction.

17. The apparatus according to claim 13, wherein said detectors detect the amplitude of the vertical component of the Earth's magnetic field.

18. The apparatus according to claim 13, wherein said detectors detect the rate of change of the vertical component of the Earth's magnetic field.

19. The apparatus according to claim 13, wherein said means utilize the variations in the detected vertical component of the Earth's magnetic field of a frequency of 0.01 to 10 Hz for predicting the occurrence of an earthquake.

* * * * *